United States Patent Office 3,186,808
Patented June 1, 1965

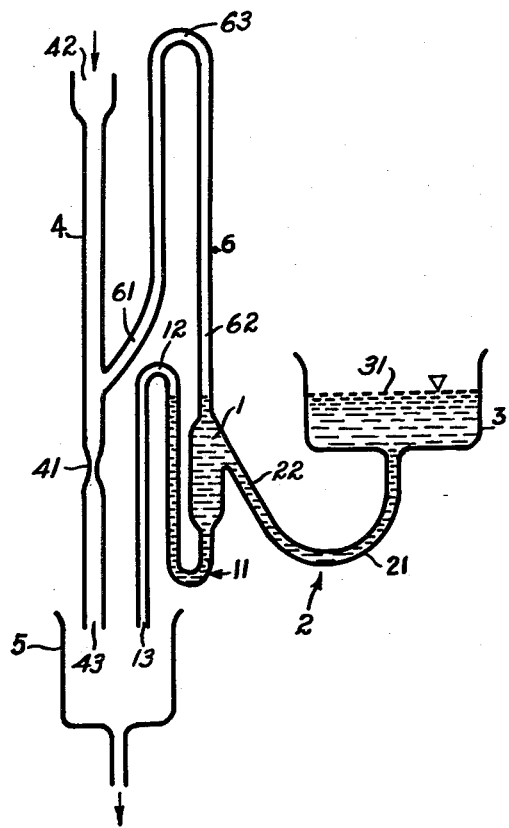

3,186,808
DEVICE FOR DOSING REAGENTS IN AUTOMATIC ANALYZERS OR OTHER INTERMITTENTLY OPERATING CHEMICAL APPARATUS
Arnošt Anscherlik, 5 Revoluncni,
Prague 1, Czechoslovakia
Filed May 19, 1961, Ser. No. 111,342
Claims priority, application Czechoslovakia,
June 24, 1960, PV 4,057/60
3 Claims. (Cl. 23—292)

The present invention relates to a dosing device for automatic analyzers or for other chemical apparatus with intermittent operation.

Automatic analyzers periodically take samples of a liquid to be tested and add uniform doses of reagents which directly or indirectly produce with substances contained in the sample characteristic changes which may be evaluated by colorimetric or other methods. The accuracy of such analyses depends on reliable and exact dosage of reagents.

In some known devices a measuring vessel is filled and emptied by valves. Other known devices rely on plunger or diaphragm pumps. In a further known apparatus, a reagent is discharged under constant pressure and the amount of reagent discharged is controlled as a function of time. Some devices are operated by suction produced by the passage of the liquid being tested.

The known dosing devices either contain moving parts which are subject to wear or they are rather complicated. Simpler devices do not dose reliably. Their precision depends on dimensions of an outlet port and the proper hydrodynamic conditions during the passage of liquid; the amount of reagent dispensed may be influenced by the presence of gas bubbles as well as by temperature and viscosity.

The shortcomings of the known dosing devices are avoided by the present invention which provides an apparatus controlled by the flow of the liquid tested without any moving parts. The device is reliable due to its extremely simple design, and is subject neither to breakdown nor to wear. The device according to the present invention permits precise dosing of reagents in intermittently operating analyzers or other chemical apparatus, is easily checked and practically independent of temperature and viscosity.

A preferred embodiment of the invention is illustrated diagrammatically in the sole figure of the attached drawing.

The device of the invention includes a vertically elongated dosing vessel 1 to the bottom of which an S-shaped siphon tube 11 is attached. The dosing vessel 1 is connected by an inlet tube 2 to a reagent supply vessel 3 in which a constant level 31 of a liquid reagent is maintained. A terminal portion 21 of the inlet tube 2 leads downward from the supply vessel 3, and another terminal portion 22 leads downward from the top of the dosing vessel 1. The entire inlet tube 2 is below the level of the liquid in the supply vessel 3, and the intermediate portion thereof between the terminal portions 21, 22 is lowest. The higher bend 12 of the siphon tube 11 is normally slightly above the liquid level in the supply vessel 3 and the discharge orifice 13 of the siphon is lower than the bottom of the dosing vessel 1.

A discharge pipe 4 extends vertically between an inlet 42 at the top and a discharge orifice 43 at the bottom. The pipe 4 has a constricted portion 41. A connecting tube 6 has terminal portions 61, 62, and an intermediate portion 63 which is high above the liquid level in the supply vessel 3. The terminal portion 61 communicates with the discharge pipe 4 above the constricted portion 41. The terminal portion 62 is connected to the top of the dosing vessel 1. The orifices 13 and 43 are located above a collecting vessel 5.

The afore-described apparatus operates as follows:

Liquid from the reagent supply vessel 3 fills the inlet tube 2, the dosing vessel 1, and the ascending portion of the siphon tube 11 to a point below the bend 12. The reagent in the supply vessel 3 is kept at a constant level 31 lower than the bend 12 so that no reagent overflows through the siphon tube 11 in the inoperative condition of the apparatus.

When a liquid sample is inserted into the open top inlet 42 of the discharge pipe 4, the liquid cannot pass quickly through the constricted portion 41 and rises in the terminal portion 61 of the connecting tube. The inlet 42 is lower than the intermediate portion 63 of the connecting tube 6, and the sample liquid thus cannot flow into the dosing vessel 1. The liquid rising in the portion 61 of the tube 6, however, displaces air which in turn depresses the liquid level in the dosing vessel 1 and in the inlet tube portion 22 until the bodies of liquid in the vessel 1 and the tube 2 no longer communicate. The resulting rise of liquid in the siphon 11 passes the bend 12, the siphon is primed, and the contents of the dosing vessel 1 are completely discharged through the orifice 13 into the collecting vessel 5. The sample eventually passes the constricted portion 41 of the pipe 4 and is mixed with the reagent in the collecting vessel 5. The mixture may then be fed to a measuring device.

After the discharge pipe 4 and the connecting tube 6 have been cleared of liquid, or after the siphon tube 11 has been completely drained, the air pressure is relieved in the dosing vessel 1, a fresh supply of reagent flows from the supply vessel 3 into the dosing vessel 1, and the apparatus is ready for the next operating cycle.

The apparatus described operates without moving parts. The amount of reagents dispensed is precisely determined by the volume of the dosing vessel, and is independent of the operating conditions. The apparatus does not require any maintenance, and is not subject to wear.

What I claim is:

1. A device for dosing a liquid comprising, in combination:

(a) a discharge pipe adapted for intermittent passage of a first liquid in a downward direction when the device is in the normal operating position thereof, said pipe having a constricted portion;

(b) a closed dosing vessel extending vertically and having a top portion and a bottom portion, when the device is in said normal operating position;

(c) liquid supply vessel means for defining a predetermined level of a second liquid in said normal position of the device:

(d) a connecting tube having two terminal portions and a portion intermediate said terminal portions, said terminal portions respectively communicating with the top portion of said dosing vessel and with a portion of said discharge pipe upwardly spaced from said constricted portion in said normal position of the device;

(e) a substantially S-shaped siphon tube connected to the bottom portion of said dosing vessel and having a discharge orifice lower than said bottom portion, a portion of said siphon tube being higher than said liquid level, and said intermediate portion of said connecting tube being substantially higher than said portion of said siphon tube in said normal position of the device; and (f) an inlet tube having two terminal portions and a portion intermediate said terminal portions, said terminal portions respectively communicating with said liquid supply vessel means and with said top portion of said dosing vessel below said liquid level, and said intermediate portion of said inlet tube being lower than said terminal portions thereof in said normal position of the device, (g) said discharge pipe having an inlet upwardly spaced from said constriction, but lower than said intermediate portion of said connecting tube in said normal position of the device.

2. A device as set forth in claim 1, further comprising a collecting vessel, said discharge pipe having a discharge orifice, the discharge orifices of said discharge pipe and of said siphon tube communicating with said collecting vessel.

3. A device as set forth in claim 2, wherein said discharge orifices are spaced from each other.

References Cited by the Examiner

FOREIGN PATENTS

| 554,600 | 2/57 | Belgium. |
| 554,660 | 2/57 | Belgium. |
| 848,125 | 9/60 | Great Britain. |

MORRIS O. WOLK, *Primary Examiner.*

MAURICE A. BRINDISI, *Examiner.*